United States Patent [19]

Vogelgesang

[11] Patent Number: 4,586,101
[45] Date of Patent: Apr. 29, 1986

[54] TAPE RECORDER CASSETTE WITH TAMPER-PROOF COUNTER

[75] Inventor: Peter J. Vogelgesang, Roseville, Minn.

[73] Assignee: Minnesota Mining and Manufacturing Company, Saint Paul, Minn.

[21] Appl. No.: 457,906

[22] Filed: Jan. 14, 1983

[51] Int. Cl.⁴ .................. B65H 75/00; G11B 23/02
[52] U.S. Cl. .................. 360/132; 360/137; 360/93; 242/199; 116/309; 235/103
[58] Field of Search .......... 360/137, 132, 93, 85, 360/83; 242/199, 55; 116/215, 309, 318; 235/103, 95 C

[56] References Cited

U.S. PATENT DOCUMENTS

| 2,756,279 | 7/1956 | Lang | 235/103 |
| 2,944,750 | 7/1960 | Hall, Jr. | 235/103 |
| 3,604,624 | 9/1971 | Miura et al. | 235/103 |
| 3,630,170 | 12/1971 | Christe | 116/114 |
| 3,678,215 | 7/1972 | Kihara | 179/100.2 |
| 3,785,551 | 1/1974 | Regan | 235/103 |
| 3,995,319 | 12/1974 | Harris | 360/137 |
| 4,274,605 | 6/1981 | Gruber, Jr. | 242/55 |
| 4,475,222 | 10/1984 | Egendorf | 360/93 |

FOREIGN PATENT DOCUMENTS

| 2151514 | 4/1972 | Fed. Rep. of Germany | 360/132 |
| 2709142 | 9/1978 | Fed. Rep. of Germany | 242/199 |
| 0976213 | 10/1948 | France | 360/137 |
| 83/02105 | 6/1983 | PCT Int'l Appl. | 360/137 |
| 0721618 | 1/1955 | United Kingdom | 235/103 |

Primary Examiner—Stuart N. Hecker
Assistant Examiner—Alfonso Garcia
Attorney, Agent, or Firm—Donald M. Sell; James A. Smith; William L. Huebsch

[57] ABSTRACT

A tape cassette having mounted between the two closely adjacent tape reels an oscillating sensor arm in substantially continuous contact with the reeled tape on the two reels, and a digital counter mechanism which is advanced one step for each double oscillation of said arm.

4 Claims, 3 Drawing Figures

TAPE RECORDER CASSETTE WITH TAMPER-PROOF COUNTER

TECHNICAL FIELD

This invention relates to the tape cassette art and in one specific aspect to cassettes for prerecorded or preprogrammed magnetic recording tapes, in particular cassettes for video tape records.

BACKGROUND ART

Video tape record cassettes are commonly distributed on a rental basis. It is therefore important to be able to determine the number of times a taped program is displayed, both for calculating the rental fee and for retiring the tape in due season.

Attempts have previously been made to determine playing time of video cassettes. U.S. Pat. No. 3,604,624 connects the incremental indicator to the drive shaft of the recorder for indicating the time of playing during a single showing. A pivoted pointer mounted between the reels and contacting the tape on one reel is used in U.S. Pat. No. 3,630,170 to measure the time of play. U.S. Pat. No. 3,678,215 counts the number of times the cassette is inserted into and removed from the recorder.

A different approach is used in U.S. Pat. No. 3,995,319 wherein is recorded the number of times the tape is transferred between a first and a second reel, using a pivoted sensing arm which, however, is capable of independent pendulum-like movement upon impact.

DISCLOSURE OF INVENTION

The present invention likewise counts the number of transfers of the tape between reels, but in a manner which prevents the reading from being altered by cassette manipulation. There is provided a sensing arm positioned to be activated by tape buildup near the close of each half cycle, i.e., when wound up on a first reel and again when rewound onto a coplanar closely adjacent second reel. The resulting to-and-fro motion of the arm then serves to advance a digital readout counter.

BRIEF DESCRIPTION OF DRAWING

The tape transfer counter will now be further described and illustrated in conjunction with the appended drawing, wherein.

DETAILED DESCRIPTION

Figure 1:
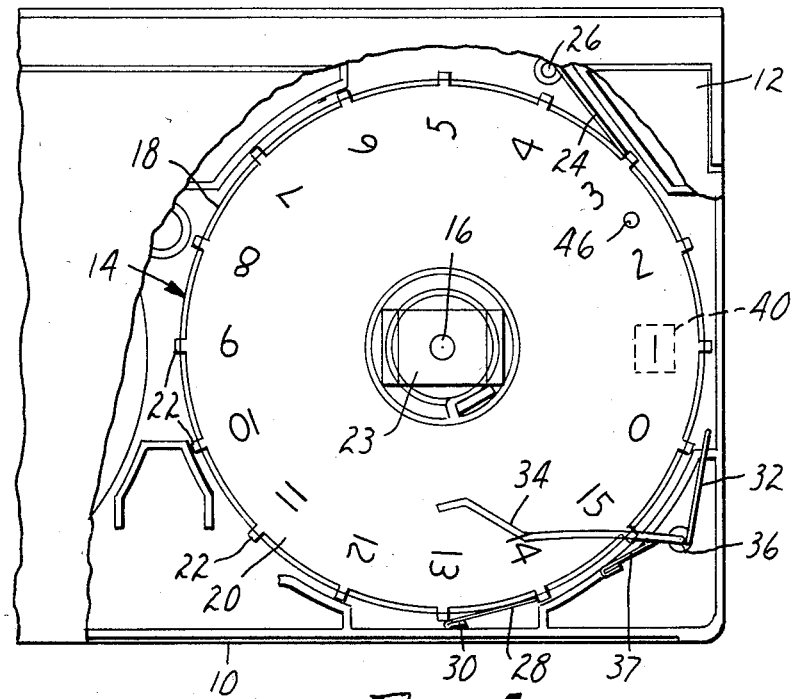
FIG. 1 is a partial top plan view of a cassette with a cover removed showing a counting mechanism according to the present invention mounted between the two closely adjacent reels.

Referring now to the drawing, there is shown a counting mechanism 10 according to the present invention in a cassette 11. The counting mechanism 10 includes a conventional three-drum counter 30 with the numbered drums supported on a main spindle 28, and a sensing arm 20 pivoted at one end in a block 34 attached to a base 14 for the cassette 11. The free end of the arm 20 is formed into a U-shaped loop 22 about the extended end of the spindle 28 which then restricts the extent of oscillation of the arm 20.

The arm 20 is centrally depressed to provide an open space between the positions occupied by tape 18 coiled on first and second reels 12, and also to provide a segment 36 perpendicular to the plane of the reels 12 and which serves as a mount for the doubly arcuate contact spring 26 having a convex surface adjacent the center of each reel 12. The spring 26 is positioned for direct contact with the reeled tape at either side to oscillate the arm 20 to the limits imposed by the end loop 22 and spindle 28 as the tape alternately fills the two reels 12.

A pawl 24 carried by the arm 20 engages teeth 31 on a units drum 32 of the counter 30 to advance the units drum 32 by one unit for each double oscillation of the arm 20. A detent 40 attached to the cassette base 14 through a supporting post 42 prevents reverse rotation of the units drum 32.

The count carried by the counter 30 is visible through a window 44 in edge portions of the base 14 and a cover 16 for the cassette 11.

FIG. 1 illustrates the position of the counting mechanism 10 when substantially the entire tape 18 has been transferred to the first or left hand reel 12. The roll of tape presses against the left half of the contact spring 26 which will be seen to be forced out of its unstressed position. The arm 20 has been swung to its farthest righthand position.

As the tape is transferred from the left hand reel 12 to the second or right hand reel 12, pressure against the contact spring 26 is relieved at the left and exerted at the right, causing the arm 20 to swing to its farthest lefthand position and causing pawl 24 to advance the units drum 32 of the counter 30 by one unit.

The spread of the curved halves of the contact spring 26 and of the two sides of the loop 22 is such that substantially no free oscillation of arm 20 is possible. The arm and attachments are of insufficient mass to overcome the spring resistance and permit counter-advancing oscillation by impact energy carried externally of the cassette 11. The entire counting mechanism 10 is inaccessibly sealed between the base 14 and cover 16 of the cassette 11. An accurate count of the number of showings of the taped program is assured.

I claim:

1. A tape cassette having first and second reels in closely adjacent coplanar positions and containing one reel of tape, and counting means for determining the number of transfers of said tape from said first to said second reel comprising a sensing arm disposed between said reels and pivotally supported at one end for oscillation between said reels, said sensing arm including a centrally attached double leaf spring having surfaces adjacent the centers of the reels for contacting the reeled tape on either reel, and means for detecting and recording the number of double oscillations of said arm comprising a spindle affixed to said cassette, indicator drums of a digital counter rotatably mounted on the spindle, and a pawl carried on said arm adjacent its free end for intermittently advancing one of said drums as said arm is oscillated from said second toward said first reel; said arm and spring being of insufficient mass to overcome the spring resistance and permit advancing the counter by impact energy applied to the cassette.

2. A cassette according to claim 1 wherein the free end of said sensing arm includes a loop and said spindle is disposed within said loop for restricting the extent of oscillation of said arm.

3. A cassette according to claim 1 further including a detent for preventing reverse rotation of said drums.

4. A cassette according to claim 1 wherein said counter is visible through an edge wall of said cassette.

* * * * *

UNITED STATES PATENT AND TRADEMARK OFFICE
CERTIFICATE OF CORRECTION

PATENT NO. : 4,586,101

DATED : April 29, 1986

INVENTOR(S) : Peter J. Vogelgesang

It is certified that error appears in the above-identified patent and that said Letters Patent is hereby corrected as shown below:

The Title Page should be deleted to appear as per attached Title Page.

Figure 2:
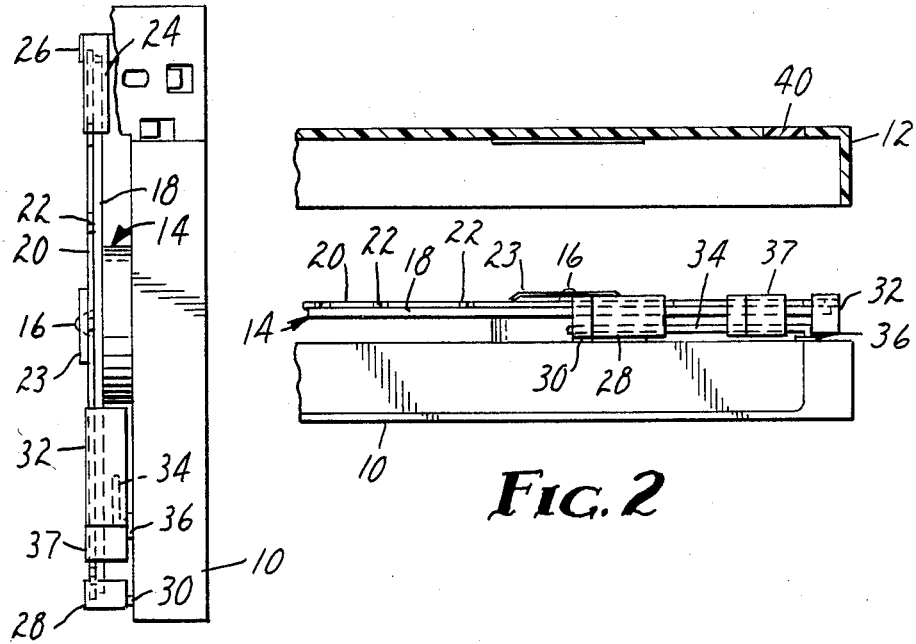
FIG. 2 is an enlarged fragmentary view in perspective showing the counting mechanism of FIG. 1.
Figure 3:
FIG. 3 is a partial side elevation showing recording drums for the counting mechanism as seen through a window in the cassette.

Figures 1-3 should be deleted to appear as per attached Figures.

Signed and Sealed this

Eighth Day of September, 1987

Attest:

DONALD J. QUIGG

*Attesting Officer*　　　　*Commissioner of Patents and Trademarks*

United States Patent [19]

Vogelgesang

[11] Patent Number: 4,586,101
[45] Date of Patent: Apr. 29, 1986

[54] TAPE RECORDER CASSETTE WITH TAMPER-PROOF COUNTER

[75] Inventor: Peter J. Vogelgesang, Roseville, Minn.

[73] Assignee: Minnesota Mining and Manufacturing Company, Saint Paul, Minn.

[21] Appl. No.: 457,906

[22] Filed: Jan. 14, 1983

[51] Int. Cl.⁴ .................. B65H 75/00; G11B 23/02
[52] U.S. Cl. ................................ 360/132; 360/137; 360/93; 242/199; 116/309; 235/103
[58] Field of Search ............... 360/137, 132, 93, 85, 360/83; 242/199, 55; 116/215, 309, 318; 235/103, 95 C

[56] References Cited

U.S. PATENT DOCUMENTS

| | | | |
|---|---|---|---|
| 2,756,279 | 7/1956 | Lang | 235/103 |
| 2,944,750 | 7/1960 | Hall, Jr. | 235/103 |
| 3,604,624 | 9/1971 | Miura et al. | 235/103 |
| 3,630,170 | 12/1971 | Christe | 116/114 |
| 3,678,215 | 7/1972 | Kihara | 179/100.2 |
| 3,785,551 | 1/1974 | Regan | 235/103 |
| 3,995,319 | 12/1974 | Harris | 360/137 |
| 4,274,605 | 6/1981 | Gruber, Jr. | 242/55 |
| 4,475,222 | 10/1984 | Egendorf | 360/93 |

FOREIGN PATENT DOCUMENTS

| | | | |
|---|---|---|---|
| 2151514 | 4/1972 | Fed. Rep. of Germany | 360/132 |
| 2709142 | 9/1978 | Fed. Rep. of Germany | 242/199 |
| 0976213 | 10/1948 | France | 360/137 |
| 83/02105 | 6/1983 | PCT Int'l Appl. | 360/137 |
| 0721618 | 1/1955 | United Kingdom | 235/103 |

Primary Examiner—Stuart N. Hecker
Assistant Examiner—Alfonso Garcia
Attorney, Agent, or Firm—Donald M. Sell; James A. Smith; William L. Huebsch

[57] ABSTRACT

A tape cassette having mounted between the two closely adjacent tape reels an oscillating sensor arm in substantially continuous contact with the reeled tape on the two reels, and a digital counter mechanism which is advanced one step for each double oscillation of said arm.

4 Claims, 3 Drawing Figures

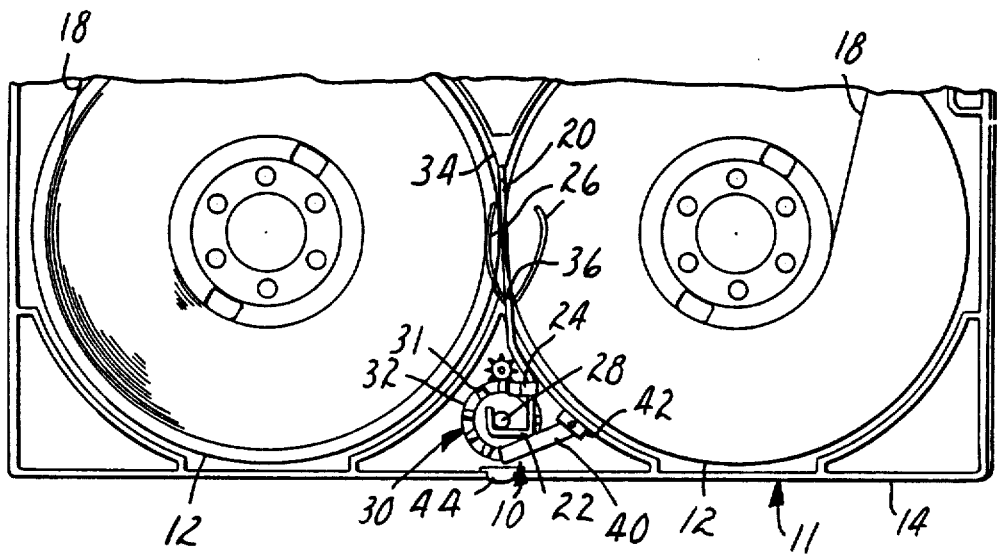

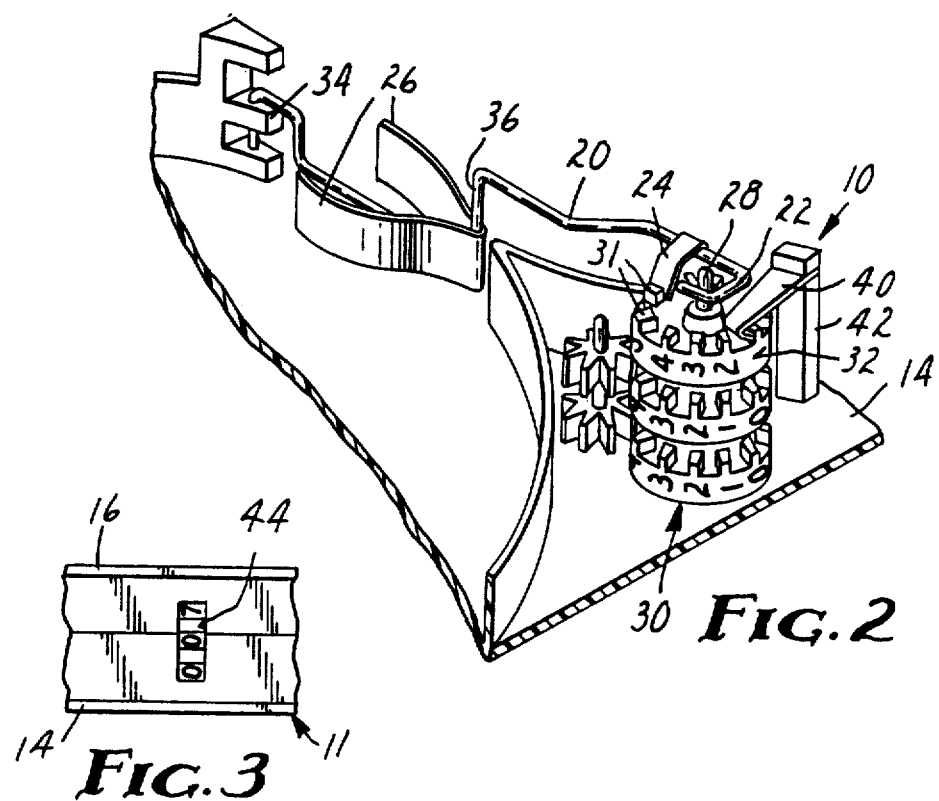
FIG. 2
FIG. 3
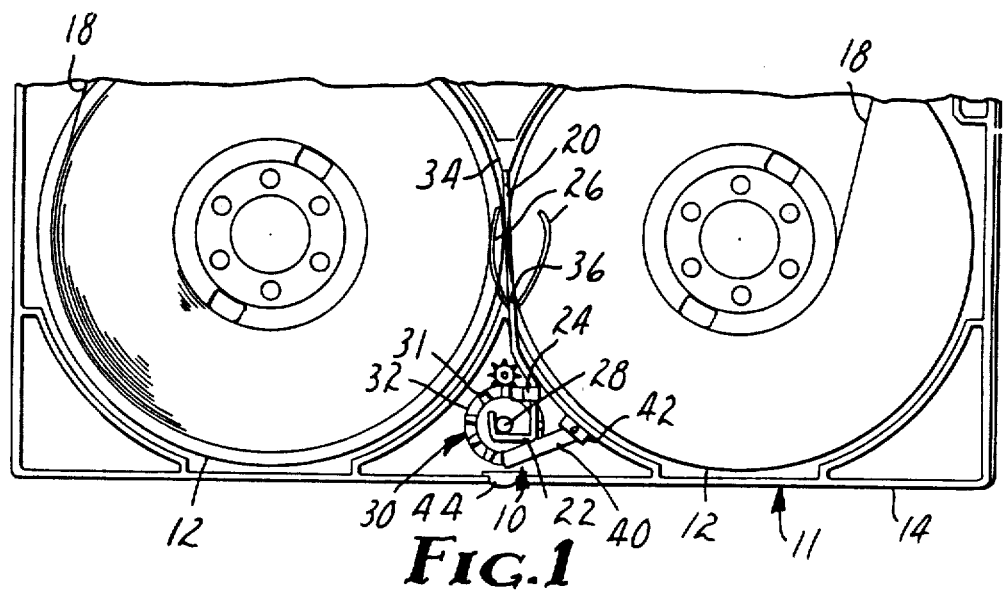
FIG. 1